(12) United States Patent
Uby (10) Patent No.: US 10,287,196 B2
(45) Date of Patent: May 14, 2019

(54) PLANT AND CONTROL METHOD FOR AEROBIC TREATMENT

(71) Applicant: XYLEM IP MANAGEMENT S.À R.L., Senningerberg (LU)

(72) Inventor: Lars Uby, Spånga (SE)

(73) Assignee: XYLEM IP MANAGEMENT S.À R.L., Luxembourg (LU)

( * ) Notice: Subject to any disclaimer, the term of this patent is extended or adjusted under 35 U.S.C. 154(b) by 234 days.

(21) Appl. No.: 15/122,801

(22) PCT Filed: Feb. 24, 2015

(86) PCT No.: PCT/IB2015/051372
§ 371 (c)(1),
(2) Date: Aug. 31, 2016

(87) PCT Pub. No.: WO2015/132695
PCT Pub. Date: Sep. 11, 2015

(65) Prior Publication Data
US 2017/0081224 A1    Mar. 23, 2017

(30) Foreign Application Priority Data

Mar. 4, 2014 (SE) ...................................... 1450237

(51) Int. Cl.
C02F 3/30 (2006.01)
C02F 3/00 (2006.01)
C02F 3/12 (2006.01)

(52) U.S. Cl.
CPC ............ *C02F 3/006* (2013.01); *C02F 3/1257* (2013.01); *C02F 3/1284* (2013.01); *C02F 3/303* (2013.01);
(Continued)

(58) Field of Classification Search
None
See application file for complete search history.

(56) References Cited

U.S. PATENT DOCUMENTS 3,990,974 A    11/1976  Sullins
4,159,243 A *  6/1979   Okey ...................... C02F 3/006
                                                                  210/199

(Continued)

FOREIGN PATENT DOCUMENTS

| GB | 2080276    | 2/1982  |
|----|------------|---------|
| JP | 2002336893 | 11/2002 |
| JP | 2005052804 | 3/2005  |

OTHER PUBLICATIONS

International Preliminary Report on Patentability for International Application No. PCT/IB2015/051372, dated May 3, 2016, 6 pages.

(Continued)

*Primary Examiner* — Chester T Barry
(74) *Attorney, Agent, or Firm* — RatnerPrestia (57) ABSTRACT

A treatment plant and a method for controlling such a treatment plant suitable for treatment of waste water. The treatment plant includes a circulation channel adapted to house a liquid, an aeration arrangement adapted to supply a gas flow Q including oxygen to the liquid, at least one flow generating machine arranged in the circulation channel and adapted to generate a liquid flow along the circulation channel, and a control unit.

21 Claims, 2 Drawing Sheets

(52) U.S. Cl.
CPC .. *C02F 2209/001* (2013.01); *C02F 2209/003* (2013.01); *C02F 2209/006* (2013.01); *C02F 2209/04* (2013.01); *C02F 2209/14* (2013.01); *C02F 2209/22* (2013.01); *C02F 2209/225* (2013.01); *C02F 2209/38* (2013.01); *C02F 2209/40* (2013.01); *C02F 2209/42* (2013.01); *Y02W 10/15* (2015.05)

(56) References Cited

U.S. PATENT DOCUMENTS

| | | | | |
|---|---|---|---|---|
| 5,582,734 | A | * | 12/1996 | Coleman ............... C02F 3/006 210/614 |
| 9,010,690 | B1 | * | 4/2015 | Al-Heraibi ............ B64D 17/00 244/100 R |
| 2008/0017558 | A1 | * | 1/2008 | Pollock ................. B01D 61/18 210/90 |
| 2012/0006414 | A1 | * | 1/2012 | Hazard ................. C02F 3/006 137/4 |
| 2013/0256225 | A1 | | 10/2013 | Leland |

OTHER PUBLICATIONS

International Search Report and Written Opinion of the International Search Authority for International Application No. PCT/IB2015/051372, dated Jun. 1, 2015, 10 pages.

Writen Opinion of the International Preliminary Examining Authority for International Application No. PCT/IB2015/051372, dated Jan. 26, 2016, 6 pages.

Bennett, G.F., et al., "Oxygen transfer rates, mechanisms, and applicationa in biological waste water treatment," Jan. 9, 2009, pp. 301-390, vol. 9, No. 4, CRC Critical Reviews in Environmental Control, CRC Press, ISN: 0007-8999.

Hedaoo, M.N., et al., "Performance of mechanical aerator in wastewater treatment with special reference to oxidation ditch: a critical review," Jan. 1, 2011, pp. 123-145, vol. 3, No. 2, International Journal of Environmental Engineering, Inderscience Publishers, Ltd., ISSN: 1756-8463, URL:http://www.inderscience.com/offer.php?id=39450.

European Communication pursuant to Article 94(3) for European Application No. 15 711 583.3, dated Oct. 25, 2018, 6 pages.

\* cited by examiner

PLANT AND CONTROL METHOD FOR AEROBIC TREATMENT

CROSS-REFERENCE TO RELATED APPLICATIONS

This patent application is a U.S. National Phase Patent Application of PCT Application No. PCT/IB2015/0051372, filed Feb. 24, 2015, which claims priority to Swedish Patent Application No. 1450237-1, filed Mar. 4, 2014, each of which is incorporated by reference herein in its entirety.

TECHNICAL FIELD OF THE INVENTION

The present invention relates in general to a treatment plant and a method for controlling a treatment plant suitable for biological treatment of liquid such as waste water. Particularly the present invention relates to a treatment plant and a method for controlling a treatment plant suitable for treatment of liquid such as waste water, the treatment plant comprising a circulation channel adapted to house a liquid, an aeration arrangement adapted to supply a gas flow Q comprising oxygen to the liquid, and at least one flow generating machine arranged in the circulation channel and adapted to generate a liquid flow along the circulation channel.

BACKGROUND OF THE INVENTION AND PRIOR ART

A circulation channel, or race track, is usually an upwards open endless basin used for biological treatment, or oxidation, of especially waste water. The waste water is made to flow along the circulation channel and thereby is made to pass different zones in the circulation channel.

During such biological cleaning the waste water is usually purified from nitrogen and biological material by having micro organisms breaking down the biological material into carbon dioxide and water, and by having bacteria transforming the water bound nitrogen to aerial nitrogen. Purified waste water is released into the nature and in the case the water bound nitrogen is not eliminated there is a risk for eutrophication in the natural watercourses, and due to the fact that the biological material is consuming considerable amounts of oxygen watercourses deficient in oxygen are generated if insufficiently purified water is released. The breaking down of the biological material is stimulated by adding large amounts of oxygen to the waste water by means of one or more aeration sectors, and the elimination of the water bound nitrogen takes place in the circulation channel in areas without added oxygen of in separate basins without added oxygen and/or in areas/basins in which the dissolved oxygen level is low enough. Along the circulation channel at least one so-called aerated zone is found and at least one so-called non aerated zone. Thus, the abovementioned aeration sector is arranged in the aerated zone.

In one, or a few, aerated zones along the circulation channel oxygen is supplied to the waste water by means of a gas flow, in the form of large amounts of gas bubbles, that is supplied to the waste water by means of aeration sectors arranged at the bottom of the circulation channel. It is advantageous to provide the gas flow as close to the bottom of the circulation channel as possible in order to maximize the dwell time of the gas in the liquid which promotes transfer of oxygen from the gas to the liquid. The micro organisms in the so-called activated sludge consume the oxygen in order to break down the biological material present in the waste water, as well as possibly for nitrification of inter alfa ammonium nitrate.

Thus, for the treatment of liquid a certain amount of oxygen in the liquid to be purified is required and/or a certain oxygen transfer rate, seen at a definite location in the specific treatment plant, which oxygen level is chosen in order to provide the best conditions possible for the activated sludge to break down the biological material. When the quantity of biological material is large, a large amount of transferred oxygen is required and the treatment plant is operating at a maximum level, and when the quantity of biological material is less, a less amount of transferred oxygen is required and the treatment plant is operating at a mean level, i.e. the need for transferred oxygen, or the oxygen transfer rate to the liquid, varieties along with the varying quantities of oxygen consuming biological material in the liquid.

Flow generating machines/mixer machines are used in circulation channels in order to mix the liquid/waste water in order to obtain an as homogenous liquid mixture as possible, keeping the biological material suspended, as well as generating a liquid flow circulating/flowing along the circulation channel.

The power consumption, and thereby the cost, for operating such a treatment plant is really high, and above all the operation of the aeration arrangement and the flow generating machines are together the most outstanding power consumer at waste water treatment. The power consumption of the aeration arrangement is about ten times greater than the power consumption of the flow generating machine in known treatment plants.

Due to the fact that the aeration arrangement according to prior art for instance was controlled directly based on the dissolved oxygen level in the liquid, the power consumption of the treatment plant was minimized when the gas flow/amount of gas, i.e. the amount of oxygen, supplied to the liquid by the aeration arrangement is adjusted to be as small as possible, i.e. gas flow minimization. This is achieved by minimizing the operational speed/rpm of the blowing machine/compressor of the aeration arrangement, or by means of a valve in the gas conduit extending to the aeration arrangement throttles the gas flow and instead use the gas flow in another aeration sector/basin.

Due to the nevertheless large power consumption every additional decrease of the power consumption/costs for liquid treatment is still of great interest from an economical point of view as well as from an environmental point of view.

Object of the Invention

The present invention aims at improving previously known methods for controlling treatment plants with the object of reducing the costs for the operation of the treatment plant and thereby providing an improved method for controlling a treatment plant. A basic object of the invention is to provide an improved method of initially defined type, which entail that the total power consumption, and thereby the cost, is reduced in relation to known methods for controlling a treatment plant at the same time as the required oxygen transfer rate to the liquid or the dissolved oxygen level in the liquid is achieved/maintained.

Brief Description of the Invention

According to the invention at least the basic object is obtained by means of the initially defined method, having the features defined in the independent claim. Preferred embodiments of the present invention are further defined in the dependent claims.

According to a first aspect of the present invention it is provided a method of the initially defined type, which method is characterized be the steps of providing a gas flow Q to the liquid by means of the aeration arrangement, operating the flow generating machine at an operational speed f to generate a liquid flow having a flow rate v along the circulation channel, measuring at least one process parameter at at least one location in the circulation channel, which process parameter, directly or indirectly, provide an indication of the oxygen transfer rate to the liquid in the treatment plant, comparing the measured value of said at least one process parameter with a set value, adjusting the oxygen transfer rate to the liquid in the treatment plant if a difference between the measured value of the process parameter and the set value is determined, the oxygen transfer rate of the treatment plant being adjusted by adjusting the gas flow Q provided by the aeration arrangement as well as adjusting the operational speed f of the flow generating machine and thereby the flow rate v of the liquid flow, in order to guide the value of said at least one process parameter towards said set value.

According to a second aspect of the present invention it is provided a treatment plant of initially defined type, which treatment plant is characterized in that the flow generating machine is adapted to be driven at an adjustable operational speed f to generate a liquid flow having a flow rate v along the circulation channel, in that the treatment plant comprises means for measuring at least one process parameter at at least one location in the circulation channel, which process parameter, directly or indirectly, provide an indication of the oxygen transfer rate to the liquid in the treatment plant, and in that the control unit is adapted to adjust the oxygen transfer rate of the treatment plant by adjusting the gas flow Q provided by the aeration arrangement as well as adjusting the operational speed f of the flow generating machine and thereby the flow rate v of the liquid flow, in order to guide the value of said at least one process parameter towards a set value.

Thus, the present invention is based on the understanding that by adjusting the operational speed of the flow generating machine, i.e. not continuously running at the maximum operational speed, the power consumption for achieving required oxygen transfer rate to the liquid or dissolved oxygen level in the liquid is minimized further then if only the gas flow from the aeration arrangement is adjusted.

According to a preferred embodiment of the present invention, the method comprises the steps of measuring the power consumption $PC_A$ for the aeration arrangement for providing said gas flow Q to the liquid, measuring the power consumption $PC_M$ for the flow generating machine at said operational speed f, and adjusting the gas flow Q provided by the aeration arrangement and the operational speed f of the flow generating machine in order to minimize the sum of the power consumption $PC_A$ of the aeration arrangement and the power consumption $PC_M$ of the flow generating machine, at the same time as the value of said at least one process parameter is guided towards the set value.

According to a preferred embodiment the relationship between the operational speed f of the flow generating machine and the gas flow Q provided by the aeration arrangement, at the time the value of said at least one process parameter is equal to the set value, is determined by the formula:

$$\frac{f}{f_0} = \left(a * \left(\frac{Q}{Q_0}\right)^b + 1 - a\right)$$

where $Q_0$ is equal to maximum gas flow, $f_0$ is equal to the operational speed of the flow generating machine at maximum gas flow $Q_0$, and a and b are constants depending on the prerequisites of the treatment plant.

According to an alternative embodiment the operational speed f of the flow generating machine is determined by means of a table having predetermined pairs of quotients $C_i$ and $d_i$ and based on the gas flow Q provided by the aeration arrangement using the relationship:

$$f/f_0 = d_i \text{ when } c_{i-1} < Q/Q_0 < c_i$$

given than $c_i < 1$ and $c_i > c_{i-1}$ where $Q_0$ is equal to maximum gas flow, $f_0$ is equal to the operational speed of the flow generating machine at maximum gas flow $Q_0$, i is a positive integer, and $C_i$ and $d_i$ are quotients dependent on the prerequisites of the treatment plant.

According to a preferred embodiment said at least one process parameter is constituted by the dissolved oxygen level in the liquid.

According to a preferred embodiment the operational speed f of the flow generating machine always shall be higher than a predetermined lowest allowed operational speed $f_{min}$, for instance for keeping the biological material suspended in the liquid and for maintaining a liquid flow along the circulation channel.

Other advantages with and features of the invention will be apparent from the other dependent claims as well as from the following, detailed description of preferred embodiments.

Further Elucidation of Prior Art

US patent application US 2013/0256225 disclose an orbital wastewater treatment system comprising a race track adapted to house the wastewater and a diffuser assembly arranged at the bottom of the race track and configured to supply pressurized air into the wastewater. Thereto, the wastewater treatment system comprises a surface aerator constituted by an aeration impeller. The rate of rotation and the degree of submergence of the aeration impeller are adjustable and change the rate of aeration of the aeration impeller, and the diffuser assembly is adjustable to balance or compensate for such a change.

BRIEF DESCRIPTION OF THE DRAWINGS

A more complete understanding of abovementioned and other features and advantages of the present invention will be apparent from the following, detailed description of preferred embodiments with reference to the appended drawings, in which.

DETAILED DESCRIPTION OF THE INVENTION

Figure 1:
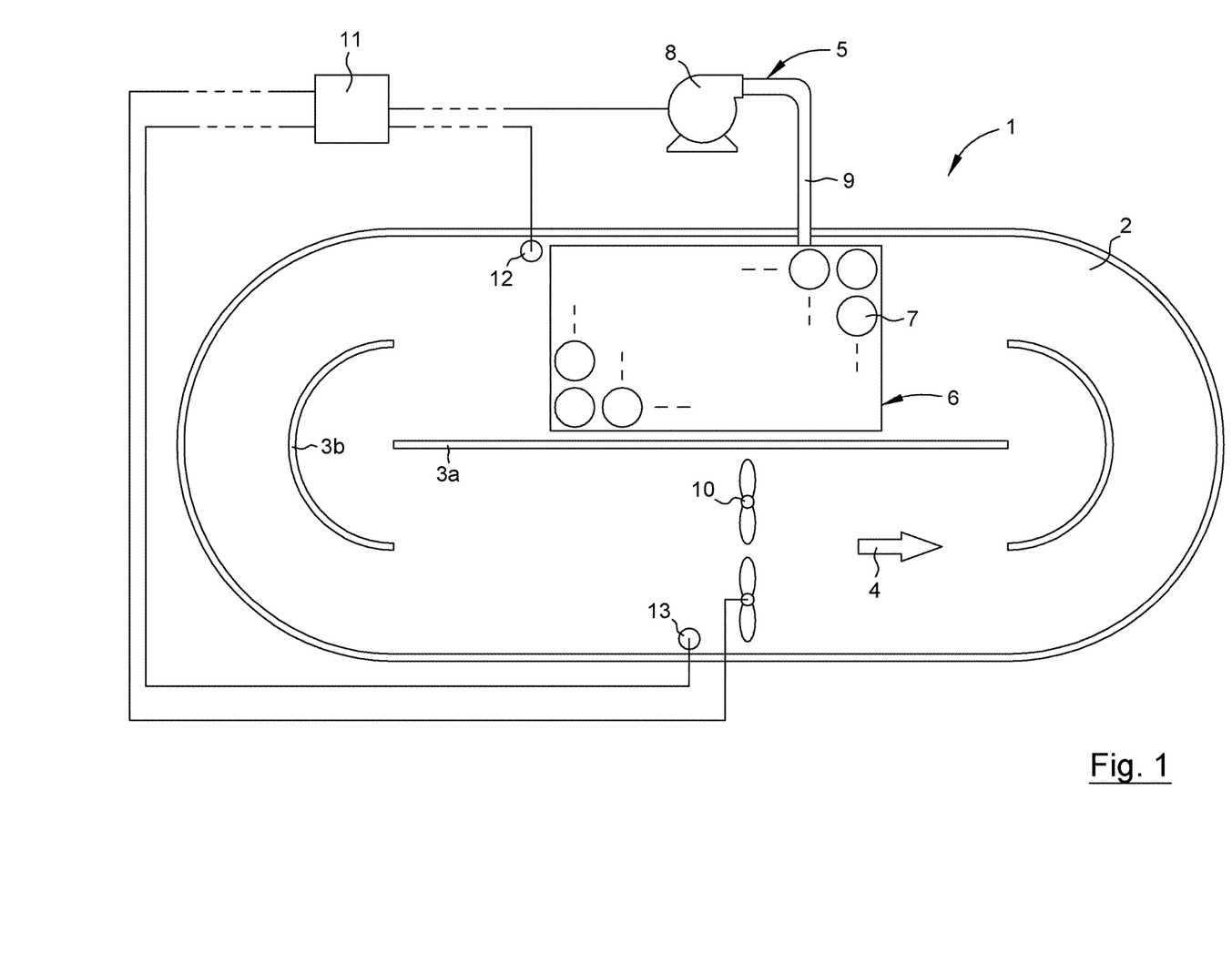
FIG. 1 is a schematic illustration of an inventive treatment plant controlled according to the inventive method.

Reference is initially made to FIG. 1. The present invention relates to a treatment plant, generally designated 1, suitable for treatment of liquid, such as waste water, comprising biological matter.

The treatment plant 1 comprises an endless circulation channel 2, or race track, adapted to house the liquid to be treated. In the disclosed embodiment the circulation channel 2 is constituted by an oblong basin having rounded ends and comprising a centrally located longitudinal divider 3a, the circulation channel 2 obtaining two parallel straight channel segments that are connected to each other by means of two direction changing/semi circular channel segments. The direction changing channel segments comprises in the disclosed embodiment guide walls 3b that facilitates the change of direction of the liquid flow. It shall be pointed out that circulation channels may present any other conceivable shape, for instance annular shape or serpentine shape, and thus the circulation channel may comprise several straight and direction changing channel segment, respectively, or may present an entirely circular/elliptic track shape.

The circulation channel 2 is adapted to house liquid/waste water up to a predetermined filling height/liquid level, even thus the actual liquid level during operation may be below as well as above said filling height without the present invention being effected. The waste water is purified either continuously or batch wise in an inventive treatment plant 1 and by having a waste water volume reaching up to said predetermined filling height an optimal utilization of the treatment plant 1 is obtained. A typical filling height is about 3-8 meters. During continuous treatment liquid is supplied continuously to the circulation channel 2 at the same time as liquid is removed continuously from the circulation channel 2. The input and the output during continuous treatment is a fraction of the circulating flow, usually about 1/30-1/20 of the circulating flow. The circulation channel 2 is arranged to have a predetermined flow direction, schematically shown by means of the arrow 4, along which the liquid is intended to flow.

Thereto the inventive treatment plant 1 comprises an aeration arrangement, generally designated 5, adapted to provide a gas flow Q comprising oxygen to the liquid. The aeration arrangement 5 comprises preferably at least one aeration sector 6, which is arranged in an aerated zone of the circulation channel 2. Those sections of the circulation channel 2 that does not comprise aeration sectors are so-called non-aerated zones. The aeration sector 6 is in the disclosed embodiment arranged in the middle of a straight channel segment, however, also other locations are conceivable such as preferably in the beginning of a straight channel segment or along the entire length of a straight channel segment and/or in a direction changing channel segment.

Said at least one aeration sector 6 is preferably arranged at the bottom of the circulation channel 2 and is adapted to provide a gas flow Q from the aeration arrangement 5 to the liquid, in order to transfer oxygen ($O_2$) from the gas to the waste water/liquid. The gas flow Q is constituted by oxygen containing gas such as air, other oxygen containing gas mixture or pure oxygen. The aeration sector 6 is for instance constituted by a large number of diffusors or aerator members 7, preferably so-called fine bubble aerators, which together cover the entire or main part of the width of the circulation channel 2. The length of the aeration sector 6 along the circulation channel 2 usually make up about 5-25% of the entire length of the circulation channel 2, however, the length of the aeration sector 6 may constitute up to 50% or more of the entire length of the circulation channel 2. Preferably the aeration arrangement 5 comprises two or more aeration sectors 6, which preferably are mutually equidistantly arranged along the circulation channel 2, see FIG. 2.

The aeration arrangement 5 thereto comprises at least one blowing machine 8 that provides gas to the aeration sector 6 via a pipe system 9. Treatment plants 1 may comprise a set of blowing machines 8, that jointly serve a pipe system that in its turn extend to one or more aeration sectors of one or more circulation channels 2. In such arrangements having several blowing machines and several aeration sectors the gas supply to each aeration sector 6 is controlled by means of valves and/or adjustment of the operational speed/rpm of the blowing machine.

Thereto the inventive treatment plant 1 comprises at least one flow generating machine 10 arranged in the circulation channel 2, the location of the flow generating machine is herein defined as being upstream said at least one aeration sector 6. The flow generating machine 10 is adapted to generate a liquid flow flowing along said circulation channel 2, and may be constituted by one or more submergible mixer machines, often so-called slowly operated mixer machines having a propeller rotating at a rpm in the area less than 100 rpm, usually in the area 20-50 rpm. Other suitable flow generating machines are pumping mixer machines such as an axial pump, or so-called fish-tail mixers, etc. Preferably the treatment plant 1 comprises flow generating machines 10 at two or more locations, which preferably are mutually equidistantly arranged along the circulation channel 2, see FIG. 2. Preferably the distance between a aeration sector 6 and a flow generating machine 10 is at least as big as the distance between a flow generating machine 10 and an aeration sector 6 seen in the flow direction 4, such that the operation of the aeration sector 6 shall not be negatively effected by the operation of the flow generating machine 10. In the optimal embodiment a homogenous and uniform liquid flow reach the aeration sector 6 and the liquid flow reaching the flow generating machine 10 is free from gas bubbles and gas flow induced currents. The flow generating machine 10 shall preferably be located at a distance from the direction changing channel segment of the circulation channel 2 such that a counter force does not arise from the walls of the circulation channel 2 that act against the flow generating machine 10 and that has a negative effect on the generation of the liquid flow.

The form of the aeration arrangement 5, i.e. the type of the aeration member 7, the length and width of the aeration sector 6, pipe conduits, etc., and the location of the aeration sector 6, to a great degree effect the liquid flow and thereby the oxygen transfer ability. Thereto it is preferred that the aeration sector 6 is not located to close to the outlet of the circulation channel 2, in order to prevent that gas bubbles or to large amount of dissolved oxygen is carried to the next process step in the treatment plant 1.

It is essential for the present invention that the method for controlling the treatment plant 1 comprises the steps of providing a gas flow Q to the liquid by means of the aeration arrangement 5, operating the flow generating machine 10 at an operational speed f to generate a liquid flow having a flow rate v along the circulation channel 2, measuring at least one process parameter at at least one location in the circulation channel 2, which process parameter, directly or indirectly, provide an indication of the oxygen transfer rate to the liquid in the treatment plant 1, comparing the measured value of said at least one process parameter with a set value, adjusting the oxygen transfer rate to the liquid in the treatment plant 1 if a difference between the measured value of the process parameter and the set value is determined, the oxygen transfer rate of the treatment plant 1 being adjusted by adjusting the gas flow Q provided by the aeration arrangement 5 as well as adjusting the operational speed f of the flow generating machine 10 and thereby the flow rate v of the liquid flow, in order to guide the value of said at least one process parameter towards said set value.

The treatment plant also comprises a control unit 11, that is adapted to control the process parameter, and thereby the oxygen transfer rate to the liquid, towards the set value. The control unit 11 is operatively connected to the aeration arrangement 5 and the flow generating machine 10.

Preferably the operational speed f of the flow generating machine 10 shall always be higher than a predetermined lowest allowed operational speed $f_{min}$. At an operational speed lower than the lowest allowed operational speed $f_{min}$, the liquid flow risk to be not homogenous enough but solid matter will sediment at the bottom of the circulation channel 2 at the same time as the flow rate v of the liquid flow risk to be too low for the required process result of the specific treatment plant 1 to be reach. Thereto it is preferred that the operational speed f of the flow generating machine 10 always is lower than a predetermined highest allowed operational speed $f_{max}$, in order not to risk to overload the flow generating machine 10.

Preferably the method also comprises the steps of measuring the power consumption $PC_A$ for the aeration arrangement 5 for providing said gas flow Q to the liquid, measuring the power consumption $PC_M$ for the flow generating machine 10 at said operational speed f, and adjusting the gas flow Q provided by the aeration arrangement 5 and the operational speed f of the flow generating machine 10 in order to minimize the sum of the power consumption $PC_A$ of the aeration arrangement 5 and the power consumption $PC_M$ of the flow generating machine 10, at the same time as the value of said at least one process parameter is guided towards the set value and thereby the oxygen transfer rate to the liquid is changed.

In order to adjust the gas flow Q provided by the aeration arrangement 5 the operational speed/rpm of the blowing machine 8 is preferably changed, alternatively the amount of gas that is allowed to pass from the blowing machine 8 to the aeration sector 6 is changed by means of a valve (not shown) arranged in the pipe system 9.

It is essential that said at least one process parameter that is measured, directly or indirectly, is/provides an indication of the oxygen transfer rate to the liquid and/or the dissolved oxygen level in the liquid, and thereby an indication if the oxygen transfer rate need to be increased or decreased. According to the most preferred embodiment the dissolved oxygen level is measured directly, and in an alternative embodiment the dissolved oxygen level is measured indirectly, for instance by measuring the redox potential of the process which indicates if there is a need for increasing/decreasing the oxygen transfer rate, or by diagnose the condition/status of the process which indicates if there is a need for increasing/decreasing the oxygen transfer rate. An increase of the oxygen transfer rate is in question when the dissolved oxygen level in the liquid is too low, and a decrease of the oxygen transfer rate is in question when the dissolved oxygen level in the liquid is too high. It shall be realized that several process parameters can be measured and guided towards respective set values, which process parameters jointly or separately, directly or indirectly, is/provide an indication of the oxygen transfer rate to the liquid and/or the dissolved oxygen level in the liquid. For instance systems shall be pointed out in which an immediate total consumption takes place of all the oxygen transferred, i.e. the oxygen level is unmeasurable/about zero, in spite of the fact that a pronounced oxygen transfer to the liquid. In such cases the dissolved oxygen level cannot be measured directly but a diagnosis of the process must take place in order to determine if the oxygen transfer rate need to be adjusted.

In order to measure/determine the dissolved oxygen level in the liquid the treatment plant 1 preferably comprises an oxygen sensor 12 located at a predetermined location in the circulation channel 2. The description of the location of the oxygen sensor is also valid for other process parameter sensors if nothing else is indicated. The oxygen sensor 12 is operatively connected to the control unit 11. The oxygen sensor 12 is preferably located in connection with the end of the aeration sector 6 seen in the flow direction 4 along the circulation channel 2, alternatively in the area directly downstream the aeration sector 6. Other conceivable locations of the oxygen sensor 12 are somewhere straight above the aeration sector 6. For instance the oxygen sensor may be located in the area direct upstream the aeration sector in order to obtain information from the location where the dissolved oxygen level in the liquid is lowest. Thereto several oxygen sensors may be arranged at a greater distance downstream the aeration sector 6 in order to obtain information about the process to break down the organic material in the liquid continues along the flow direction 4.

Each treatment plant 1 has its own prerequisites/requirements, for instance status and content of the incoming liquid to be treated, desired status of the liquid leaving the circulation channel, etc., and thereby has different terms of for instance the dissolved oxygen level and its profile along the circulation channel 2. In some processes one which that all or almost all oxygen shall be consumed before the liquid reaches the next aeration sector, and in some processes one which that a relatively high dissolved oxygen level in the entire liquid volume. Typical values for the dissolved oxygen level in connection with the end of the aeration sector 6 is 1-3 mg oxygen ($O_2$) per liter liquid, however, the oxygen level may for some plants amount to 6 mg oxygen per liter liquid. Most often one which to have non-aerated zones in which the dissolved oxygen level undergo 0.5 mg oxygen per liter liquid, in order for other processes in the treatment shall take place.

Along the circulation channel it can in brief be described that the dissolved oxygen level increase above aeration sector in the aerated zone due to oxygen is being provided, and decrease in the non-aerated zone due to the oxygen being consumed. The flow rate along the circulation channel effect the rate at which the dissolved oxygen level decrease in the non-aerated zone, as well as the rate at which the dissolved oxygen level increase in the aerated zone, given a certain amount of organic material. A higher flow rate in the area above the aeration sector entails the gas bubbles to be smaller and thereby the contact area between the gas and the liquid is increased which promote the oxygen transfer rate (kg oxygen per hour), and thereto a more turbulent flow is generated which also promotes the oxygen transfer rate. A higher flow rate also entails that the dwell time of the gas bubbles in the liquid increase which promotes the oxygen transfer rate.

The dissolved oxygen level is highest in connection with the end of the aeration sector 6, and lowest in the area direct upstream the aeration sector 6. The value of the predetermined, or process depending, set value of the dissolved oxygen level in the liquid, this is also valid for other process parameters, is thus depending on at which location in the circulation channel the measuring takes place. Thereto the set value can be adjusted over time for instance depending on changed status and content of the incoming liquid, changed required status of the outgoing liquid, etc. The set value can be set/adjusted manually or automatically.

Furthermore the treatment plant 1 can comprise other sensors/probes that together with, or instead of, the oxygen sensor 12 effect/indicates if the oxygen transfer rate must be increased or decreased in order to maintain the right value of the dissolved oxygen level in the liquid and/or another process parameter. For instance a none disclosed ammonium sensor may be used, the value of which indicates the oxygen consumption rate in the liquid, whereupon the control unit 11 based on the ammonium sensor value adjust the set value of dissolved oxygen level in the liquid, and for the process parameter, which in its turn together with the measured value of the dissolved oxygen level in the liquid, or another process parameter, determine if the gas flow Q of the aeration arrangement 5 and/or the operational speed f of the flow generating machine 10 shall be adjusted. Yet another alternative is a system that measures the oxygen level in the gas leaving the liquid and compares it with the oxygen level in the gas provided to the liquid, a so-called "off gas"-meter. An "off gas" measurement that extends over time provides a direct measurement of the oxygen transfer rate of the treatment plant. "Off gas" measurement also has the advantage that no sensors are located in the liquid and thereby cannot be effected/destroyed by the liquid. Adjustment of the bowing machine can also include ON/OFF control.

The treatment plant 1 preferably comprises at least one sensor 13 for measuring the flow rate v of the liquid flow. The speed sensor 13 is operatively connected to the control unit 11. The speed sensor 13 is according to one embodiment located submerged in the liquid in the circulation channel 2, and preferably the speed sensor 13 shall be located at a position in the circulation channel 2 at which the liquid flow is free from gas bubbles from the aeration sector 6, since gas bubbles effects/disturb the speed sensor 13 such that it risk to give false values regarding the flow rate. In an alternative embodiment the speed sensor is located above the liquid and measure the flow rate of the liquid flow using contact free measurement, in order not to risk that solid matter in the liquid destroy/disturb the speed sensor 13.

The speed sensor shall preferably be located at a position in the circulation channel 2 having maximally developed flow. In other words a location in the circulation channel 2 at which installations, aeration sectors 6, flow generating machines 10, etc. does not effect the flow profile of the liquid flow. Downstream the flow generating machine 10 and at the aeration sector 6 the liquid flow is unstable and turbulent, and a measurement of the flow rate at these locations risk giving false values of the flow rate. Thus, the speed sensor 13 shall preferably be located at a straight channel segment of the circulation channel 2 upstream the flow generating machine 10, most preferably in the area direct upstream the flow generating machine 10. The flow rate shall be kept within an approved interval for the specific treatment plant 1, which interval shall secure that the liquid flow is homogenous enough and that the requirements of the treatment process are reached.

The relationship between the operational speed f of the flow generating machine 10 and the gas flow Q provided by the aeration arrangement 5, at the time the value of said at least one process parameter is equal to the set value, is preferably determined by either of the following two methods.

According to the first method the relationship is determined by the formula:

$$\frac{f}{f_0} = \left( a * \left( \frac{Q}{Q_0} \right)^b + 1 - a \right)$$

where $Q_0$ is equal to maximum gas flow, $f_0$ is equal to the operational speed of the flow generating machine 5 at maximum gas flow $Q_0$, and a and b are constants depending on the prerequisites of the treatment plant 1, such as one or more of the design of the circulation channel 2, intended filling height/liquid level in the circulation channel 2, the design of the aeration arrangement 5 and its location in the circulation channel 2, the capacity of the flow generating machine 10 and its location in the circulation channel 2, the efficiency of the aeration arrangement 5, the efficiency of the flow generating machine 10, required range of the dissolved oxygen level in the liquid, etc.

The values of the constants a and b are typically determined, but not necessarily, during initial tuning of the specific treatment plant 1. Alternatively the constants a and b can be determined by data simulation before the treatment plant 1 is taken in operation according to the inventive method.

In practice a number of runs are made at different operational speed f of the flow generating machine 10 whereupon corresponding gas flow Q from the aeration arrangement 5 are obtained. From a number of sets of f and Q the constants a and b can be determined for the specific treatment plant 1.

According to the other method the relationship is determined based on predetermined table of values. More precisely the operational speed f of the flow generating machine 10 is determined by means of a table having predetermined pairs of quotients $C_i$ and $d_i$ and based on the gas flow Q provided by the aeration arrangement 5, i.e. for each value of $Q/Q_0$ there is a predetermined value of $f/f_0$. When $[c_{i-1} < Q/Q_0 < c_i]$ then $[f/f_0 = d_i]$, given that $[c_i < 1]$ and $[c_i > c_{i-1}]$, where i=1, 2, 3 ..., $Q_0$ is equal to maximum gas flow, $f_0$ is equal to the operational speed of the flow generating machine 5 at maximum gas flow $Q_0$, and $C_i$ and $d_i$ are quotients dependent on the prerequisites of the treatment plant 1.

The values of $c_i$ and $d_i$ are typically determined, but not necessarily, during initial tuning of the specific treatment plant 1. Alternatively $c_i$ and $d_i$ can be determined by data simulation before the treatment plant 1 is taken in operation according to the inventive method.

$c_i$ and $d_i$ are dependent on the prerequisites of the treatment plant 1, such as one or more of the design of the circulation channel 2, intended filling height/liquid level in the circulation channel 2, the design of the aeration arrangement 5 and its location in the circulation channel 2, the capacity of the flow generating machine 10 and its location in the circulation channel 2, the efficiency of the aeration arrangement 5, the efficiency of the flow generating machine 10, required range of the dissolved oxygen level in the liquid, etc.

It shall be pointed out that the operational speed of the flow generating machine 10 in an alternative, entirely equivalent, way can be expressed as the operational rpm of the flow generating machine 10 or the operating electric frequency without effecting the present invention. This adheres to the entire document if nothing else is indicated.

Figure 2:
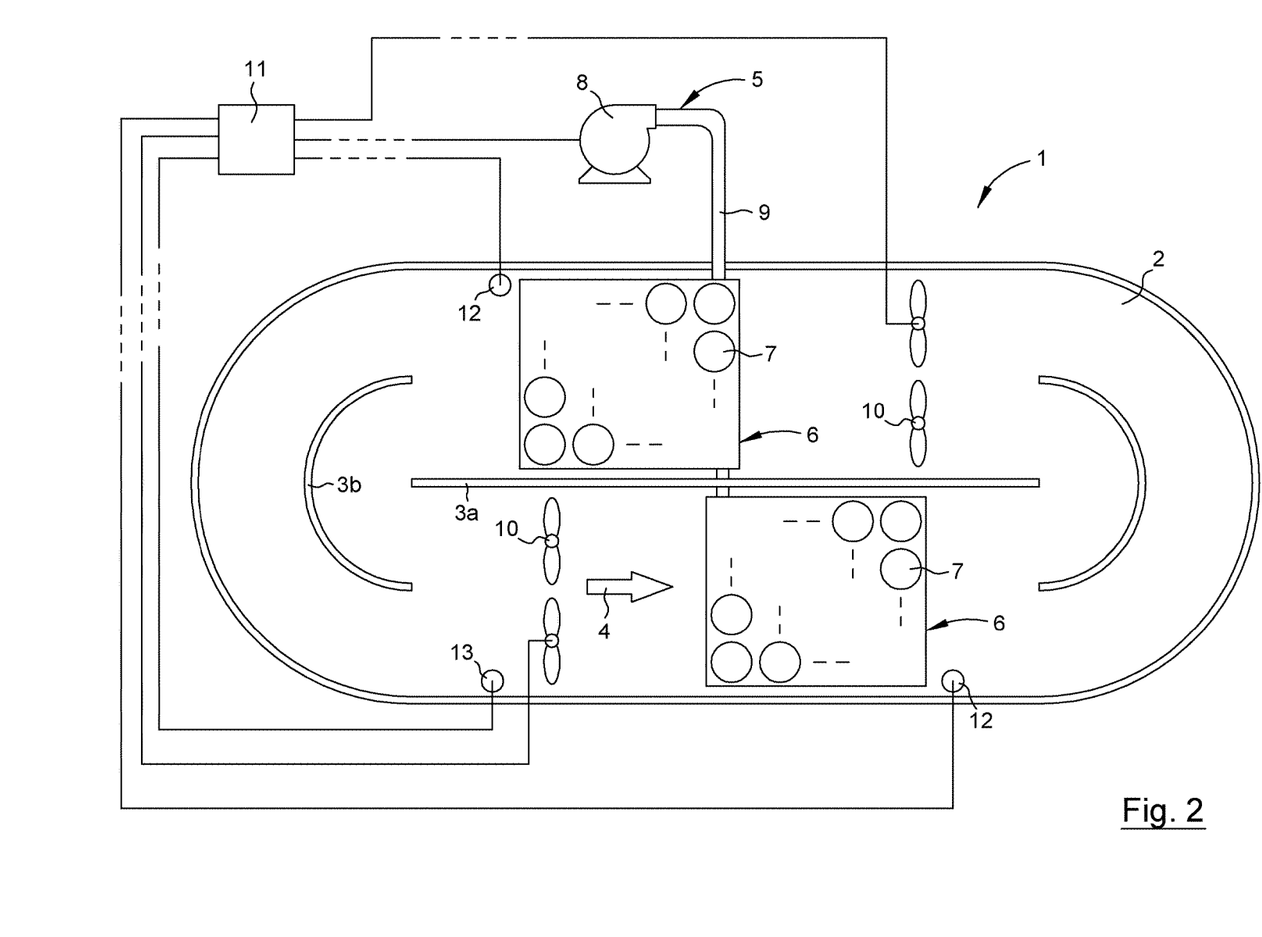
FIG. 2 is a schematic illustration of a treatment plant according to an alternative embodiment.

Reference is now made to FIG. 2. In this embodiment the treatment plant 1 comprise two sets of an aeration sector 6 and at least one flow generating machine 10, where the sets are located in one straight channel segment each. Thereto the treatment plant comprises two oxygen sensors 12, or other process parameter sensor, one at each aeration sector 6. The treatment plant 1 comprises a speed sensor 13. However, it is conceivable that the treatment plant 1 comprises one ore more speed sensors 13 and one or more oxygen sensors 12. The control unit 11 is operatively connected to each oxygen sensor 12, each speed sensor 13, each flow generating machine 10 and the aeration arrangement 5. The aeration sectors 6 can be adapted to provide mutually different gas flows. It shall also be pointed out that a combination of the embodiments disclosed in FIGS. 1 and 2 is conceivable, where the aeration sector 6 and the flow generating machine 10 are located in the same straight channel segment.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A method for controlling a treatment plant for treating liquid, the treatment plant comprising (i) a circulation channel adapted to house a liquid, (ii) an aeration arrangement adapted to supply a gas flow Q comprising oxygen to the liquid, and (iii) at least one flow generating machine arranged in the circulation channel and adapted to generate a liquid flow along the circulation channel, the at least one flow generating machine comprising a submersible mixer machine, the method comprising the steps of:
   providing a gas flow Q to the liquid via the aeration arrangement,
   operating the flow generating machine at an operational speed f to generate a liquid flow having a flow rate v along the circulation channel,
   measuring at least one process parameter at at least one location in the circulation channel, which process parameter, directly or indirectly, provides an indication of a dissolved oxygen concentration of the liquid in the treatment plant,
   comparing the measured value of said at least one process parameter with a set value, and
   adjusting the dissolved oxygen concentration of the liquid in the treatment plant responsive to a difference between the measured value of the process parameter and the set value by adjusting the gas flow Q provided by the aeration arrangement, adjusting the operational speed f of the flow generating machine and thereby the flow rate v of the liquid, or a combination thereof, to guide the measured value of said at least one process parameter towards said set value,
   wherein a relationship between the operational speed f of the flow generating machine and the gas flow Q pro-
vided by the aeration arrangement, at a time the value of said at least one process parameter is equal to the set value, is determined by the formula:

$$\frac{f}{f_0} = \left(a * \left(\frac{Q}{Q_0}\right)^b + 1 - a\right)$$

where $Q_0$ is equal to maximum gas flow,
   $f_0$ is equal to the operational speed of the flow generating machine at maximum gas flow $Q_0$, and
   a and b are constants dependent on prerequisites of the treatment plant, including one or more of an intended liquid level in the circulation channel, a location of the aeration arrangement in the circulation channel, a capacity of the flow generating machine, a location of the flow generating machine in the circulation channel, an efficiency of the aeration arrangement, an efficiency of the flow generating machine, and a required range of the dissolved oxygen concentration in the liquid.

2. The method according to claim 1, wherein the method comprises the steps of:
   measuring a power consumption $PC_A$ for the aeration arrangement for providing said gas flow Q to the liquid,
   measuring a power consumption $PC_M$ for the flow generating machine at said operational speed f, and
   adjusting the gas flow Q provided by the aeration arrangement and the operational speed f of the flow generating machine to minimize a sum of the power consumption $PC_A$ of the aeration arrangement and the power consumption $PC_M$ of the flow generating machine, simultaneously with guiding the measured value of said at least one process parameter towards the set value.

3. A method for controlling a treatment plant for treating liquid, the treatment plant comprising (i) a circulation channel adapted to house a liquid, (ii) an aeration arrangement adapted to supply a gas flow Q comprising oxygen to the liquid, and (iii) at least one flow generating machine arranged in the circulation channel and adapted to generate a liquid flow along the circulation channel, the at least one flow generating machine comprising a submersible mixer machine, the method comprising the steps of:
   providing a gas flow Q to the liquid via the aeration arrangement,
   operating the flow generating machine at an operational speed f to generate a liquid flow having a flow rate v along the circulation channel,
   measuring at least one process parameter at at least one location in the circulation channel, which process parameter, directly or indirectly, provides an indication of a dissolved oxygen concentration of the liquid in the treatment plant,
   comparing the measured value of said at least one process parameter with a set value, and
   adjusting the dissolved oxygen concentration of the liquid in the treatment plant responsive to a difference between the measured value of the process parameter and the set value by adjusting the gas flow Q provided by the aeration arrangement, adjusting the operational speed f of the flow generating machine and thereby the flow rate v of the liquid, or a combination thereof, to guide the measured value of said at least one process parameter towards said set value,
   wherein the operational speed f of the flow generating machine is determined by a table having predetermined pairs of quotients $C_i$ and $d_i$ and based on the gas flow Q provided by the aeration arrangement using the relationship:

$$f/f_0 = d_i \text{ when } c_{i-1} < Q/Q_0 < c_i$$

given than $c_i < 1$ and $c_i > c_{i-1}$ where $Q_0$ is equal to maximum gas flow,
$f_0$ is equal to the operational speed f of the flow generating machine at maximum gas flow $Q_0$,
i is a positive integer, and
$C_i$ and $d_i$ are quotients dependent on prerequisites of the treatment plant, including one or more of an intended liquid level in the circulation channel, a location of the aeration arrangement in the circulation channel, a capacity of the flow generating machine, a location of the flow generating machine in the circulation channel, an efficiency of the aeration arrangement, an efficiency of the flow generating machine, and a required range of the dissolved oxygen concentration in the liquid.

4. The method according to claim 1, wherein the treatment plant comprises a sensor for measuring the dissolved oxygen concentration in the liquid.

5. The method according to claim 4, wherein the sensor is an oxygen sensor and the aeration arrangement comprises at least one aeration sector arranged in the circulation channel, the oxygen sensor being located in connection with a terminal end of the aeration sector relative to a flow direction of the liquid flow along the circulation channel.

6. The method according to claim 1, wherein the operational speed f of the flow generating machine is higher than a predetermined lowest allowed operational speed $f_{min}$.

7. The method according to claim 1, wherein the operational speed f of the flow generating machine is lower than a predetermined highest allowed operational speed $f_{max}$.

8. The method according to claim 1, wherein the aeration arrangement comprises at least one aeration sector arranged in the circulation channel.

9. The method according to claim 8, wherein the aeration arrangement comprises at least one blowing machine connected to and supplying pressurized gas to the aeration sector.

10. The method according to claim 9, wherein the gas flow Q is adjusted by adjusting an operational speed of the blowing machine.

11. The method according to claim 8, comprising at least two aeration sectors and at least two flow generating machine locations each comprising one or more flow generating machines, wherein a downstream distance between a first aeration sector and a first flow generating machine location is at least equal to a downstream distance between the first flow generating machine location and the second aeration sector relative to a flow direction of the liquid flow along the circulation channel.

12. The method according to claim 1, wherein the treatment plant comprises a sensor for measuring the flow rate v of the liquid flow.

13. The method according to claim 12, wherein the sensor is a speed sensor and the speed sensor is located upstream of the flow generating machine relative to a flow direction of the liquid flow.

14. A treatment plant for treating liquid comprising:
a circulation channel adapted to house a liquid,
an aeration arrangement adapted to supply a gas flow Q including oxygen to the liquid, at least one flow generating machine arranged in the circulation channel and adapted to generate a liquid flow along the circulation channel, the at least one flow generating machine comprising a submersible mixer machine, the flow generating machine adapted to be driven at an adjustable operational speed f to generate a liquid flow having a flow rate v along the circulation channel,
means for measuring at least one process parameter at at least one location in the circulation channel, which process parameter, directly or indirectly, provides an indication of a dissolved oxygen concentration of the liquid in the treatment plant;
a control unit adapted to control the dissolved oxygen concentration of the treatment plant by operatively adjusting the gas flow Q provided by the aeration arrangement, adjusting the operational speed f of the flow generating machine and thereby the flow rate v of the liquid flow, and a combination thereof, to guide a value of said at least one process parameter towards a set value,
wherein a relationship between the operational speed f of the flow generating machine and the gas flow Q provided by the aeration arrangement, at a time the value of said at least one process parameter is equal to the set value, is determined by the formula:

$$\frac{f}{f_0} = \left(a * \left(\frac{Q}{Q_0}\right)^b + 1 - a\right)$$

where $Q_0$ is equal to maximum gas flow,
$f_0$ is equal to the operational speed of the flow generating machine at maximum gas flow $Q_0$, and
a and b are constants dependent on prerequisites of the treatment plant, including one or more of an intended liquid level in the circulation channel, a location of the aeration arrangement in the circulation channel, a capacity of the flow generating machine, a location of the flow generating machine in the circulation channel, an efficiency of the aeration arrangement, an efficiency of the flow generating machine, and a required range of the dissolved oxygen concentration in the liquid.

15. The treatment plant according to claim 14, wherein the treatment plant comprises a sensor for measuring the dissolved oxygen concentration in the liquid.

16. The treatment plant according to claim 15, wherein the sensor is an oxygen sensor and the aeration arrangement comprises at least one aeration sector arranged in the circulation channel, the oxygen sensor located at or near a downstream terminal end of the aeration sector relative to a flow direction of the liquid flow along the circulation channel.

17. The treatment plant according to claim 14, wherein the aeration arrangement comprises at least one aeration sector arranged in the circulation channel.

18. The treatment plant according to claim 17, wherein the aeration arrangement comprises at least one blowing machine connected to and adapted to provide pressurized gas to the aeration sector.

19. The treatment plant according to claim 17, comprising at least two aeration sectors and at least two flow generating machine locations each comprising one or more flow generating machines, wherein a downstream distance between a first aeration sector and a first flow generating machine location is at least equal to a downstream distance between the first flow generating machine location and a second aeration sector relative to a flow direction of the liquid flow along the circulation channel.

20. The treatment plant according to claim 14, wherein the treatment plant comprises a sensor for measuring the flow rate v of the liquid flow.

21. The treatment plant according to claim 20, wherein the sensor is a speed sensor and the speed sensor is located upstream of the flow generating machine relative to a flow direction of the liquid flow.

* * * * *